US010844992B2

(12) United States Patent
Harrop et al.

(10) Patent No.: US 10,844,992 B2
(45) Date of Patent: Nov. 24, 2020

(54) GUIDE APPARATUS

(71) Applicant: Advanced Insulation Limited, Gloucestershire (GB)

(72) Inventors: Martin Steven Harrop, Gloucestershire (GB); Stewart Ian Morley, Gloucestershire (GB)

(73) Assignee: ADVANCED INSULATION LIMITED

( * ) Notice: Subject to any disclaimer, the term of this patent is extended or adjusted under 35 U.S.C. 154(b) by 7 days.

(21) Appl. No.: 16/094,895

(22) PCT Filed: Apr. 13, 2017

(86) PCT No.: PCT/GB2017/051042
§ 371 (c)(1),
(2) Date: Oct. 19, 2018

(87) PCT Pub. No.: WO2017/182781
PCT Pub. Date: Oct. 26, 2017

(65) Prior Publication Data
US 2019/0145569 A1 May 16, 2019

(30) Foreign Application Priority Data

Apr. 21, 2016 (GB) .................. 1606964.3

(51) Int. Cl.
*F16L 57/02* (2006.01)
*F16L 1/12* (2006.01)
(Continued)

(52) U.S. Cl.
CPC .............. *F16L 57/02* (2013.01); *F16L 1/123* (2013.01); *F16L 3/015* (2013.01); *F16L 3/08* (2013.01)

(58) Field of Classification Search
CPC ... F16L 57/02; F16L 3/015; F16L 3/08; F16G 13/16
(Continued)

(56) References Cited

U.S. PATENT DOCUMENTS 805,579 A 11/1905 Patchen
3,197,954 A * 8/1965 Merker .................. B66C 13/12
59/78.1
(Continued)

FOREIGN PATENT DOCUMENTS

EP 2503093 A2 9/2012
JP 2009060731 A 3/2009
(Continued)

OTHER PUBLICATIONS

International Search Report and Written Opinion for corresponding International Application No. PCT/GB2017/051042, dated Jul. 21, 2017.
(Continued)

*Primary Examiner* — Patrick F Brinson
(74) *Attorney, Agent, or Firm* — Tarolli, Sundheim, Covell & Tummino LLP

(57) ABSTRACT

Guide apparatus for an elongate member such as a pipeline or pipe. The apparatus comprising a plurality of first elements in the form of rings with central openings through which the elongate member extends. The first elements are interconnected by link members spaced around the outside of the first elements and locating in T-shaped cross section guide formations. The link members restrict the amount of pivotal movement between the first elements, and hence bending of the elongate member.

21 Claims, 20 Drawing Sheets

(51) Int. Cl.
*F16L 3/015* (2006.01)
*F16L 3/08* (2006.01)

(58) Field of Classification Search
USPC .......................................... 138/110, 155, 120
See application file for complete search history.

(56) References Cited

U.S. PATENT DOCUMENTS

| | | | | |
|---|---|---|---|---|
| 4,396,797 | A * | 8/1983 | Sakuragi | ................. F16L 11/18 |
| | | | | 138/110 |
| 4,616,369 | A | 10/1986 | Rademacher | |
| 5,215,338 | A * | 6/1993 | Kimura | ................. F16L 3/015 |
| | | | | 138/120 |
| 7,469,722 | B2 * | 12/2008 | Berland | ............... H01R 13/562 |
| | | | | 138/110 |
| 2005/0056333 | A1 * | 3/2005 | Utaki | ................. H02G 11/006 |
| | | | | 138/120 |
| 2008/0066821 | A1 * | 3/2008 | Komiya | ................. F16G 13/16 |
| | | | | 138/110 |
| 2009/0194186 | A1 | 8/2009 | Gross | |
| 2010/0228295 | A1 | 9/2010 | Whitefield | |
| 2013/0315673 | A1 | 11/2013 | Pionetti et al. | |

FOREIGN PATENT DOCUMENTS

| | | |
|---|---|---|
| JP | S3177562 U | 8/2012 |
| WO | 2010128351 A1 | 11/2010 |
| WO | 2011096820 A2 | 8/2011 |

OTHER PUBLICATIONS

Search Report for corresponding UK Application No. 1705987.4, dated Oct. 9, 2017.

* cited by examiner

GUIDE APPARATUS

RELATED APPLICATIONS

The present invention is a U.S. National Stage under 35 USC 371 patent application, claiming priority to Serial No. PCT/GB2017/051042, filed on 13 Apr. 2017; which claims priority of GB 1606964.3, filed on 21 Apr. 2016, the entirety of both of which are incorporated herein by reference.

This invention concerns a guide apparatus, and particularly a guide apparatus for an elongate member.

In a number of situations it is required to provide a guide apparatus for an elongate member such as a pipeline, which restricts the amount of bending of the pipeline overall, and for instance at particular locations. A number of prior arrangements have been proposed, and one of these is a vertebrae system including a number of rings with inter engaging formations which limit relative movement. With such a system, on the outside of a bend the components will be in tension, and this in particular can lead to failure of the arrangement.

According to an aspect of the invention there is provided guide apparatus for an elongate member, the apparatus comprising a plurality of elements locatable adjacent each other along the length of the elongate member, with each element extending around the elongate member, a plurality of elongate link members being provided between adjacent elements, the link members being spaced from each other around the elements, the link members permitting limited movement apart of the respective elements, such that the apparatus permits limited bending of the elongate member.

The elements may be slidably movable relative to the link members, and guide formations may be provided on the elements, through which guide formations the link members slidably extend. The guide formations may have a generally T-shape cross section, with a narrow opening and a wider main part to receive the link members once they have passed through the opening during formation of the apparatus. The link members may comprise lengths of planar material.

The link members may extend along and between a plurality of adjacent elements. Restriction formations may be provided on the link members to restrict the amount of movement between the link members and the elements, and the restriction formations may locate between adjacent elements.

Outwardly extending engagement members may be provided on ends of the elements, engageable against the ends of adjacent elements when the apparatus is bent, on the inside of the bend.

In one arrangement the engagement members are integrally formed with the remainder of the elements.

In a further arrangement the engagement members are in the form of a plurality of discrete members provided on the ends of each element, and the engagement members may be in the form of pads.

The engagement members may be selectively mountable on ends of each element.

The engagement members may be formed of a resilient material.

In one embodiment the elements have a side opening such that they can be located on an elongate member, by the elongate member passing through the side opening, and the elements may be configured such that they have to be deformed to permit the elongate member to pass through the side opening. Adjacent elements may be orientated such that the side openings in adjacent elements are not aligned.

Closure members may be provided locatable in the side openings once the elements are mounted on an elongate member.

In a further embodiment the elements define a closed loop around the elongate members, and during formation of the apparatus the elements are moved axially along an elongate member to a required position.

The elements may be made of a plastics material, and may be made of polypropylene.

At least four link members may be provided for each element, and five or six link members may be provided for each element.

The elements may be formed in two parts, which parts may be identical. The parts may have an open configuration with a front face and inner and outer sides, and a framework of webs therebetween.

A sleeve member may be provided locatable around the elongate member within the elements. The sleeve member may be formed of a softer material than the elements, a side opening may be provided in the sleeve member to permit location on an elongate member by deformation of the sleeve member. Spaced rims may be provided along the length of the sleeve member, such that the elements locate between respective rims.

In one embodiment the sleeve member may be over moulded onto the elements.

In one arrangement a respective individual sleeve member may be provided extending between each pair of adjacent elements, and formations may be provided on the elements, which formations may be in the form of steps against which ends of the individual sleeve members engage.

The individual sleeve members may be incorporated in the elements during formation thereof, such that one side of the elements has a male form incorporating an individual sleeve member, which side is sealable adjacent a side of a further element with a female form without an individual sleeve member.

The link members may be in the form of straps, rope or alternatively pins, and may be made of an elastic material.

The link members may be different at different parts of the apparatus, to provide different stiffnesses and/or permit different amounts of flexing of an elongate member.

In one configuration adjacent link members on each element extend in opposite directions to each other, to each connect to just one respective adjacent element.

At least eight guide members, and in one example ten, may be provided around each element.

A temporary wrap may be provided around the apparatus to provide protection during installation, and the temporary wrap may be such as to degrade during use.

Embodiments of the present invention will now be described by way of example only and with reference to the accompanying drawings, in which:—

Figure 1:
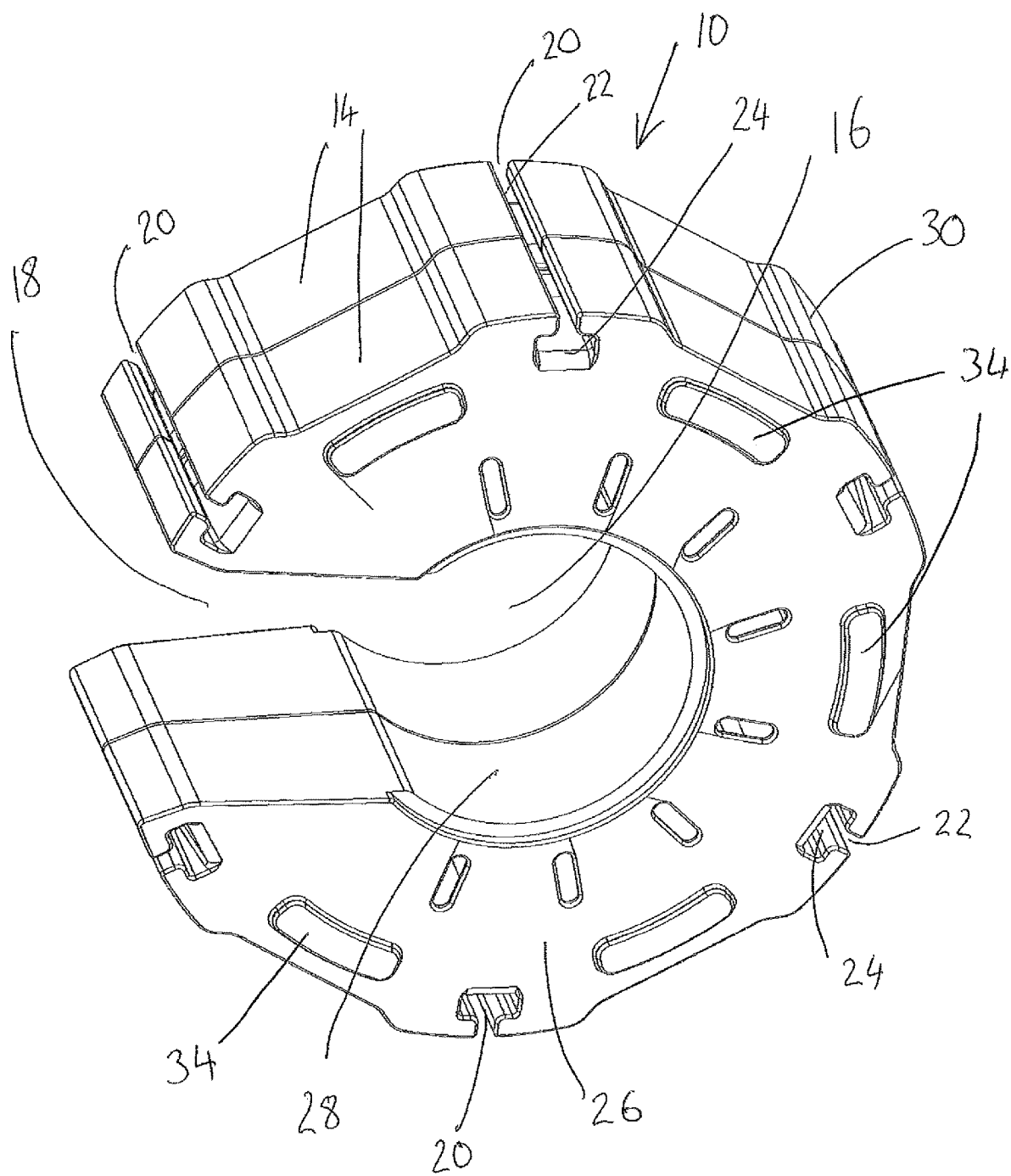
FIG. 1 is a diagrammatic perspective view of a first element according to the invention.
Figure 2:
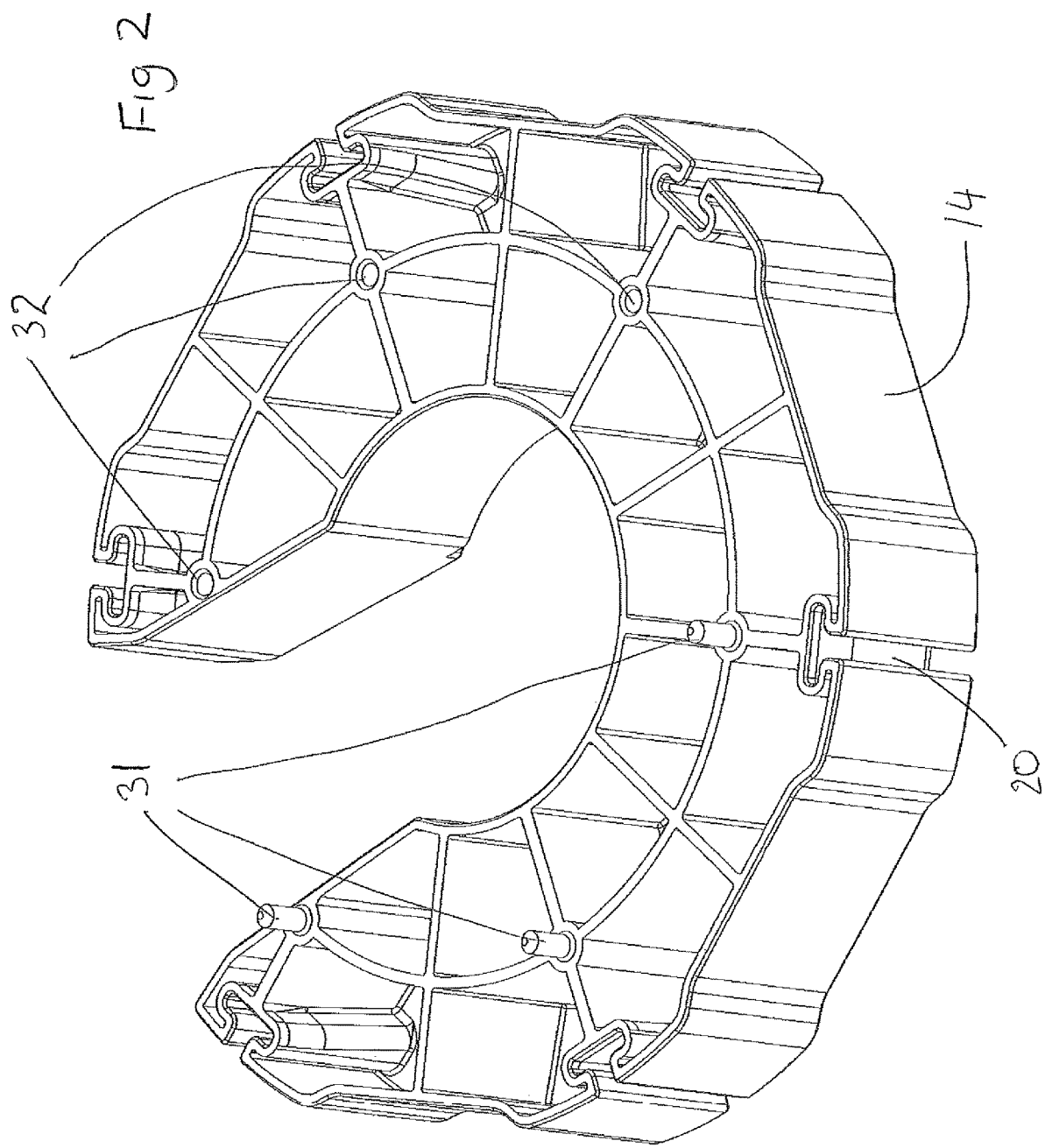
FIGS. 2 and 3 are perspective views from opposite sides of parts of the first element of FIG. 1.
Figure 3:
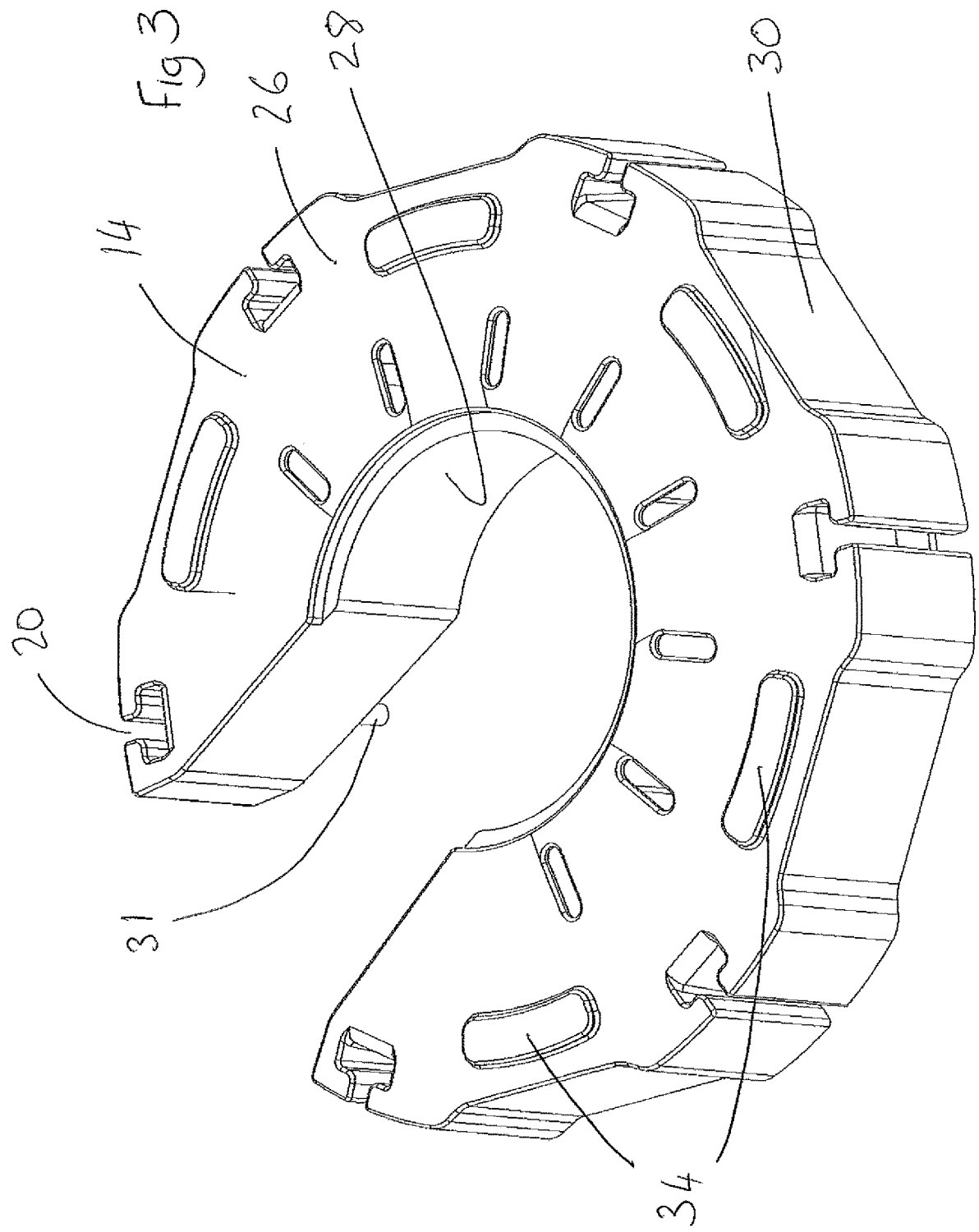
Figure 4:
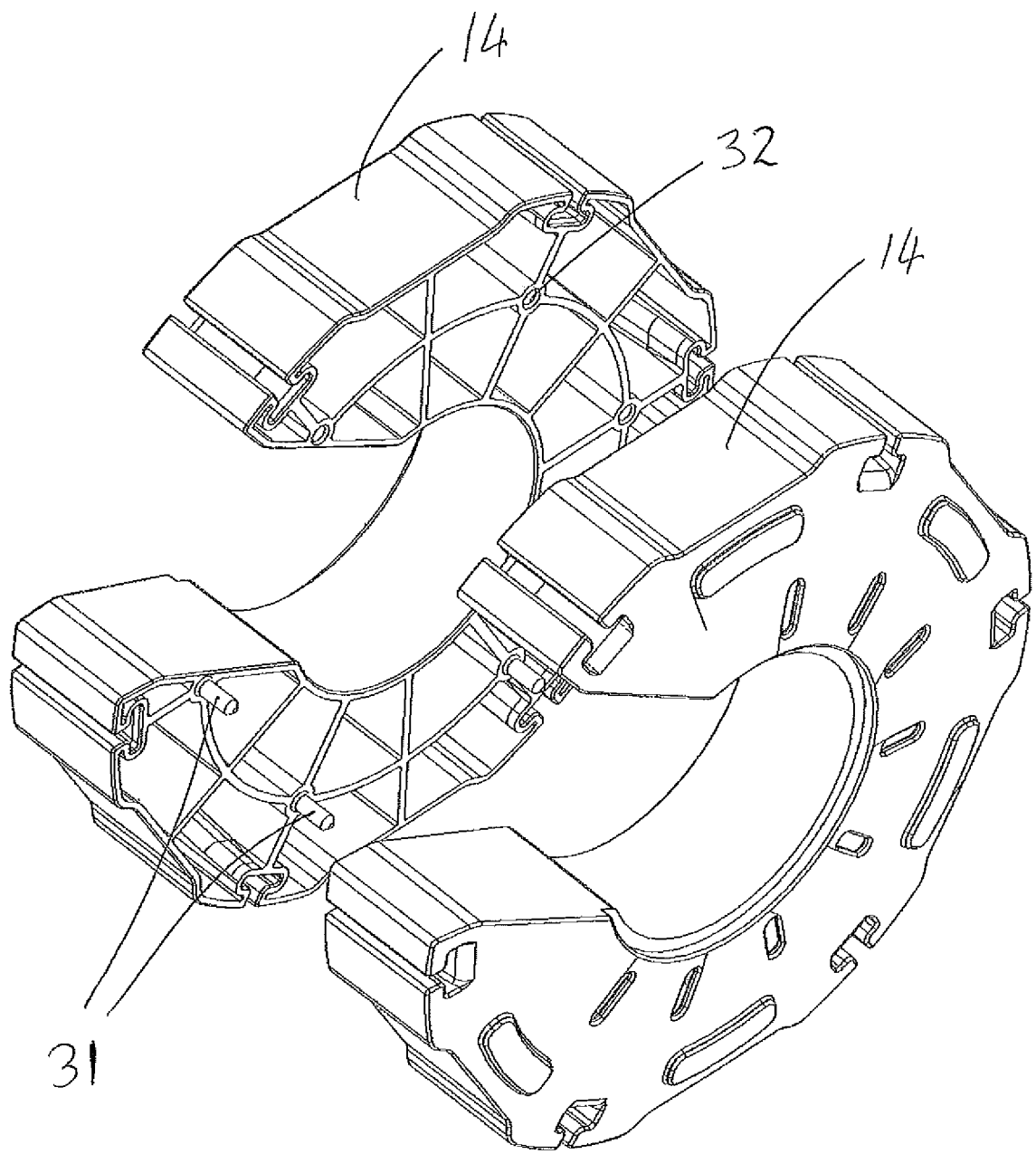
FIG. 4 is a perspective view showing the parts of FIGS. 2 and 3 aligned with each other.

FIGS. 1-4 show a first element 10 of guide apparatus 12 according to the invention. The first element 10 is formed of two identical parts 14 which together form a hollow body as shown in FIG. 1 which defines a ring with a central opening 16 and a side opening 18 which is smaller than the diameter of the central opening 16. The element 10 is made of a plastics material, and in this instance polypropylene.

Six guide formations 20 are provided equispaced around the circumference of the first element 10, and each of the guide formations 20 has a substantially T-shaped cross section with a narrow opening 22 leading to a wider main part 24.

As can be seen from FIGS. 1-4, the parts 14 are identical and are hollow with a front faces 26 and inner and outer faces 28, 30. Three upstanding pins 31 are provided on each part 14 locatable in respective sockets 32 on the other part 14 to locate and interconnect the two parts 14.

Engagement members are provided on the front faces 26, in the form of five discrete projections 34, each located towards the outer face 30, equidistant between a respective adjacent pair of guide formations 20. The projections 34 have a gently curved face to ensure a smooth engagement as the first elements 10 come together as the apparatus 12 is bent.

Figure 5:
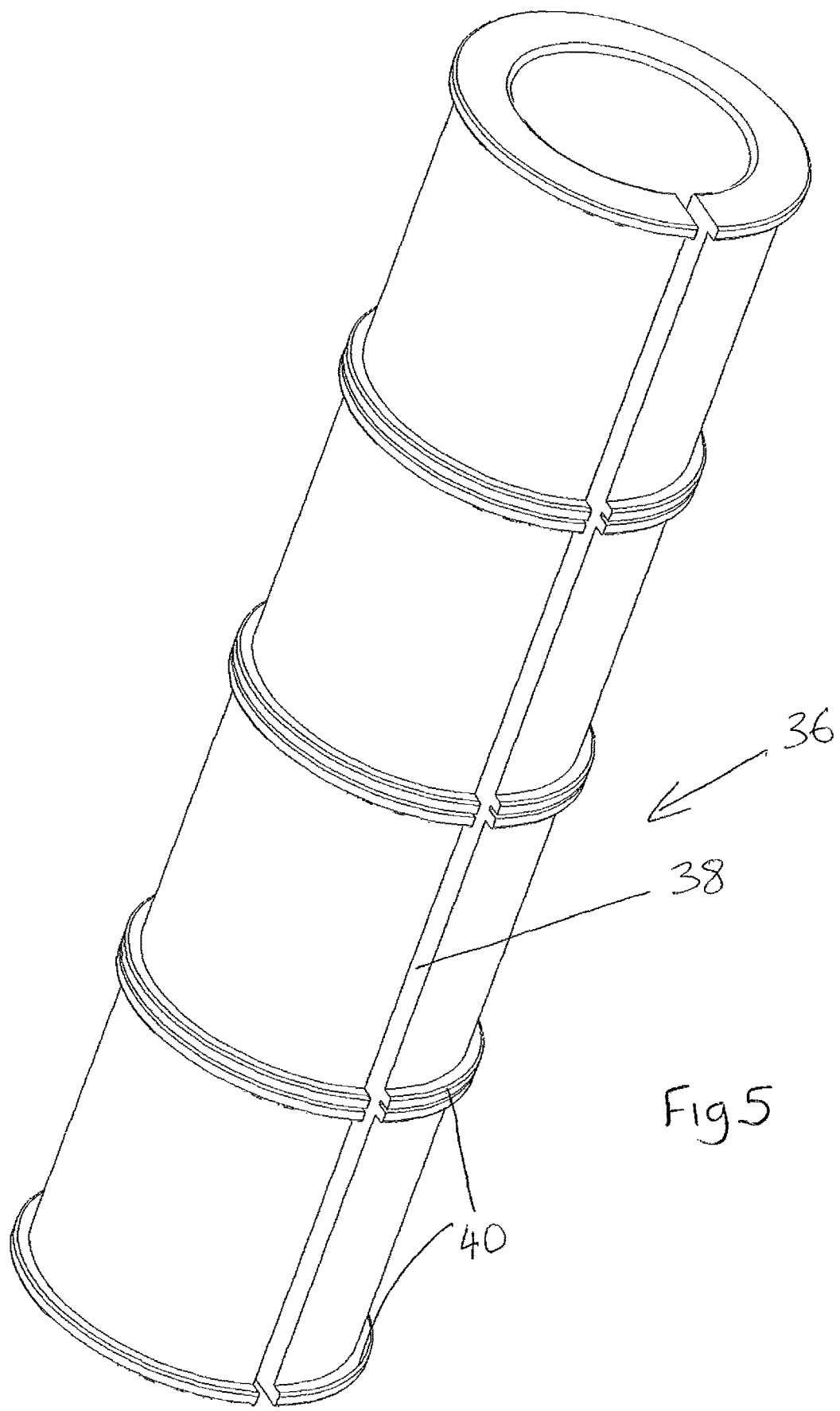
FIG. 5 is a diagrammatic perspective view of a sleeve member according to the invention.

FIG. 5 shows a sleeve member 36 which is generally annular in cross section apart from a side opening 38. A plurality of spaced rims 40 are provided on the sleeve member 36, at distances corresponding to just greater than the thicknesses of the first elements 10. The sleeve member 36 is made of a softer material than the first elements 10, and may be made for example of polyurethane.

Figure 6:
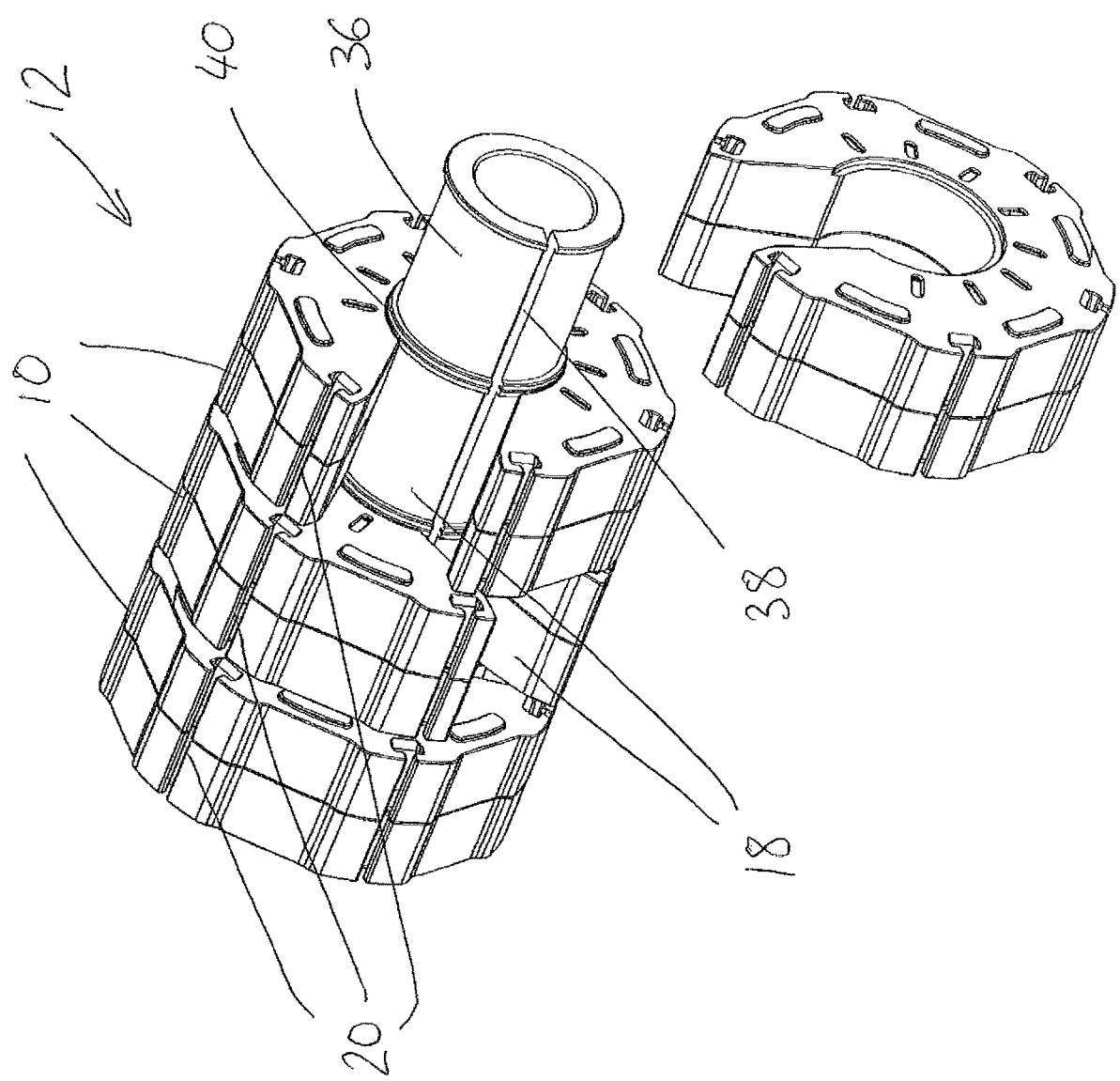
FIG. 6 is a diagrammatic perspective view showing the first elements of sleeves of FIGS. 1-5 being mounted together.

FIG. 6 shows the first elements 10 being mounted on the sleeve member 36, with the first elements 10 locating between respective rims 40, and the side openings 18 in adjacent first elements 10 being aligned differently from each other.

Figure 7:
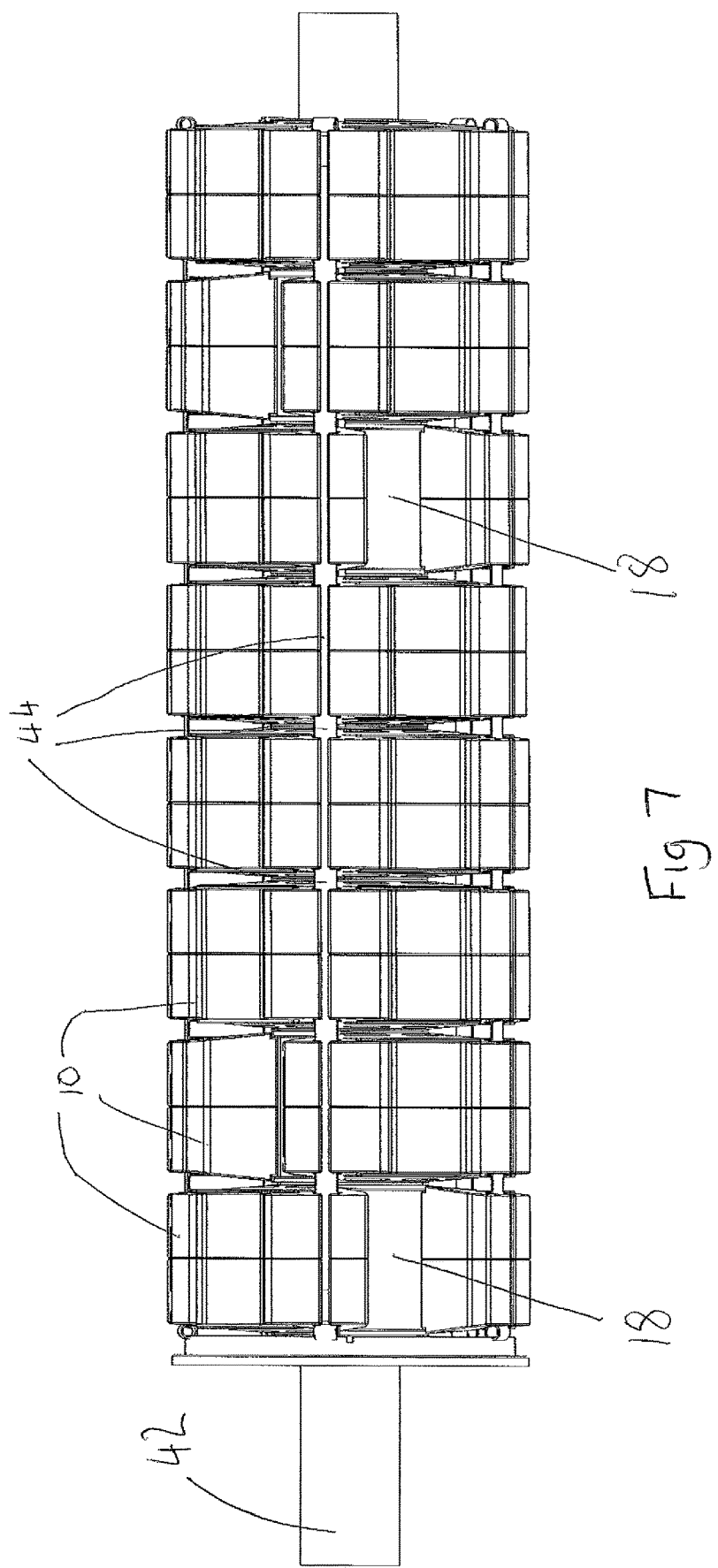
FIGS. 7 and 8 are respectively side and perspective views of the first elements and the sleeve of FIGS. 1-5 mounted on an elongate member.
Figure 8:
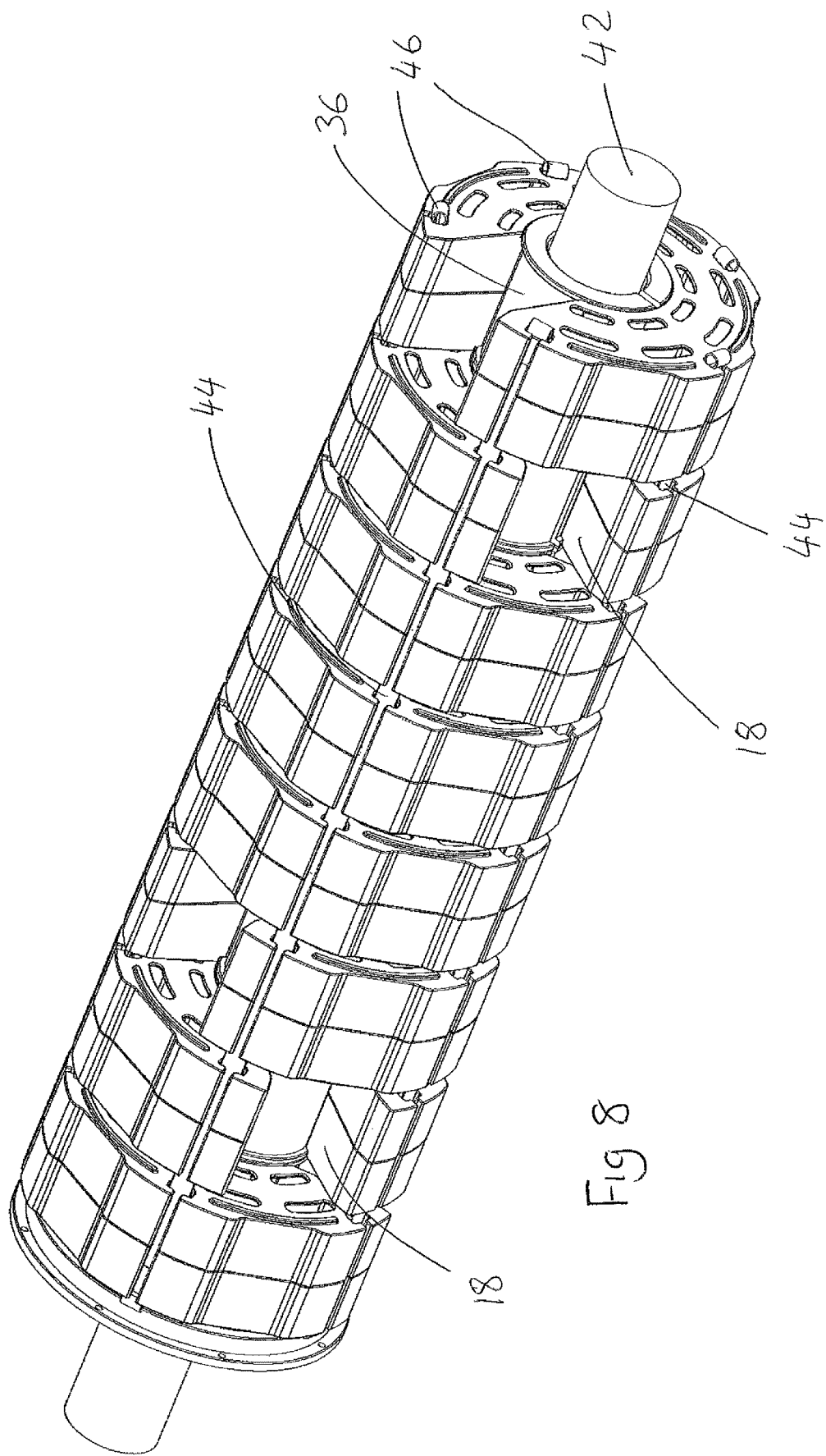

FIGS. 7 and 8 shows eight such first elements 10 mounted on a respective sleeve member 36 on an elongate member 42 such as a pipeline or for example a pipe including cables or otherwise, which could be used in a wind farm or in hydrocarbon production. As can be seen the first elements 10 are mounted with their side openings 18 not in alignment with those on adjacent first elements 10.

Six elongate link members 44 are provided, one for each of the guide formations 20 on the first elements 10, noting that the first elements 10 are orientated such that guide formations 20 on adjacent first elements 10 are aligned with each other. The link members 44 comprise straps which extend through the main part 24 of the respective guide formations 20, and end members 46 are provided at each end to retain the link members 44 in position relative to the end most first elements 10.

In use the apparatus 12 permits limited bending of the elongate member 42, by virtue of the first elements 10 slidably movable together along the link member 44 on one side of the elongate member 42, and slidably movable apart by relative sliding movement of the first elements 10 and link members 44 on the opposite side. On the inside of the bend, the projections 34 on adjacent first elements 10 will engage against each other, thereby limiting the amount of bending, and preventing damage or stress points on the front faces 26 of the first elements 10.

This arrangement means that the first elements 10 are not in tension, but the bending movement is achieved by relative sliding movement between the first elements 10 and the link members 44. The link members 44 have some elasticity and so provide increasing amounts of resistance to bending, at the maximum limit of permitted bending. The sleeve member 36 being made of a softer material avoids stress points against the elongate member 42.

The apparatus 12 may be mounted on the elongate member 42 in the following way. Initially the sleeve member 36 is mounted on the elongate member 42 by deforming the sleeve member 36 such that the elongate member 42 can pass through the side opening 38. The first elements 10 are then located on the sleeve member 36 on the elongate member 42. This is achieved by deforming the first elements 10 and the sleeve member 36, such that the elongate member 42 can pass through the side opening 18. The first elements 10 are located between respective pairs of rims 40, with guide formations 20 on adjacent first elements 10 aligned, but the side openings 38 on adjacent first elements 10 not aligned.

The link members 44 can then be inserted into the guide formations 20 through the narrow openings 22, and may require folding to pass through the narrow openings 22, but then lay flat in the main parts 24. The end members 46 are then mounted by any appropriate method.

There is thus described a guide apparatus which can be readily mounted in a required position, and uses a number of identical components. The apparatus generally avoids areas of stress being applied to the members and/or the elongate member, by virtue of the link members and sleeve. The amount of bending permitted for any application is determined by the choice of link members and/or engagement members. In this instance the engagement members are integrally formed with the remainder of the element. If elements with more or less pronounced engagement members are required, changes can be made to the tool used to mould the elements.

The apparatus can be customised to provide different performance along the length of an elongate member, for instance by using link members of different length and/or elasticity, and/or engagement members of different size.

Figure 9:
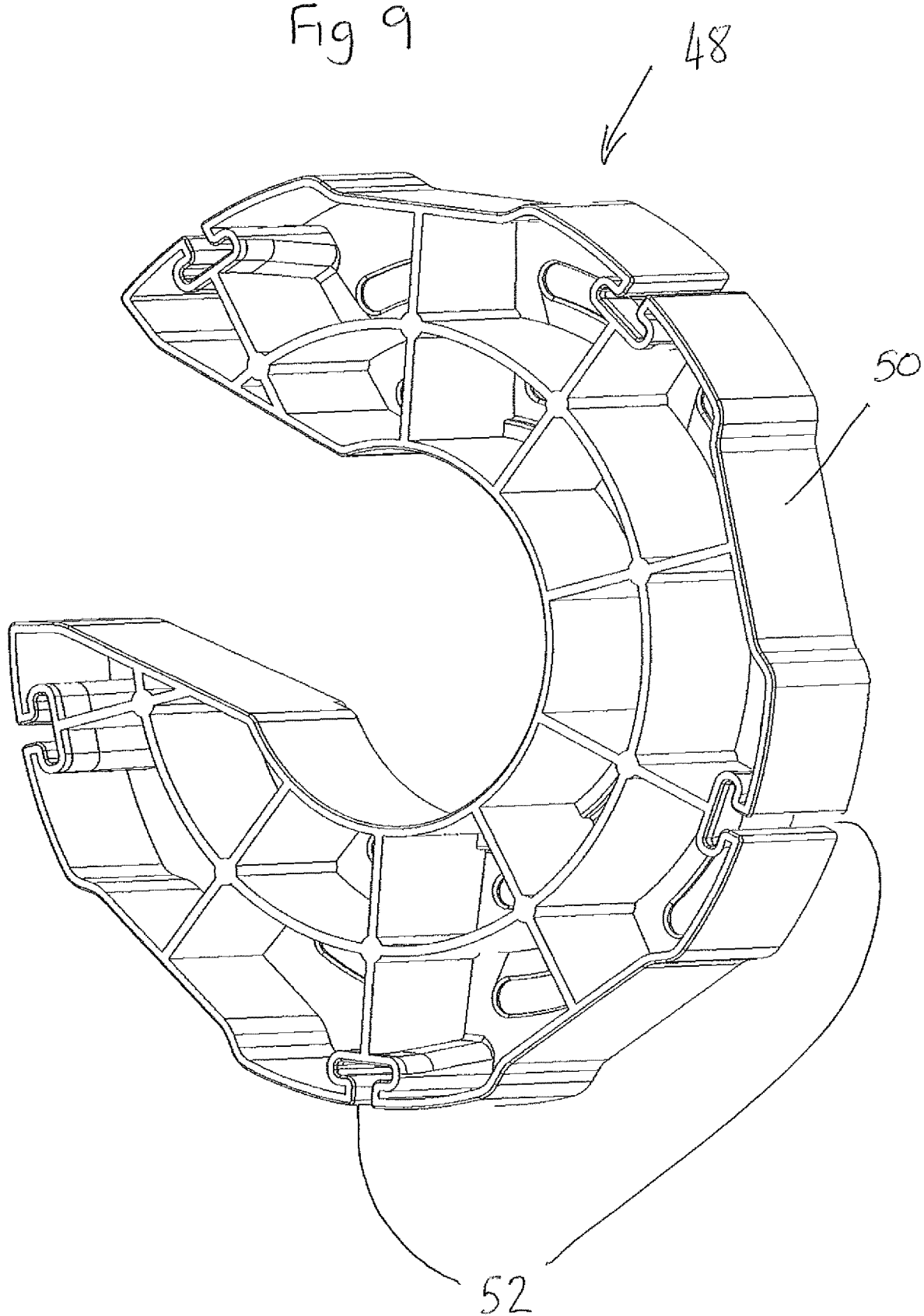
FIGS. 9 and 10 are respectively perspective and front views of parts of a second element according to the invention.
Figure 10:
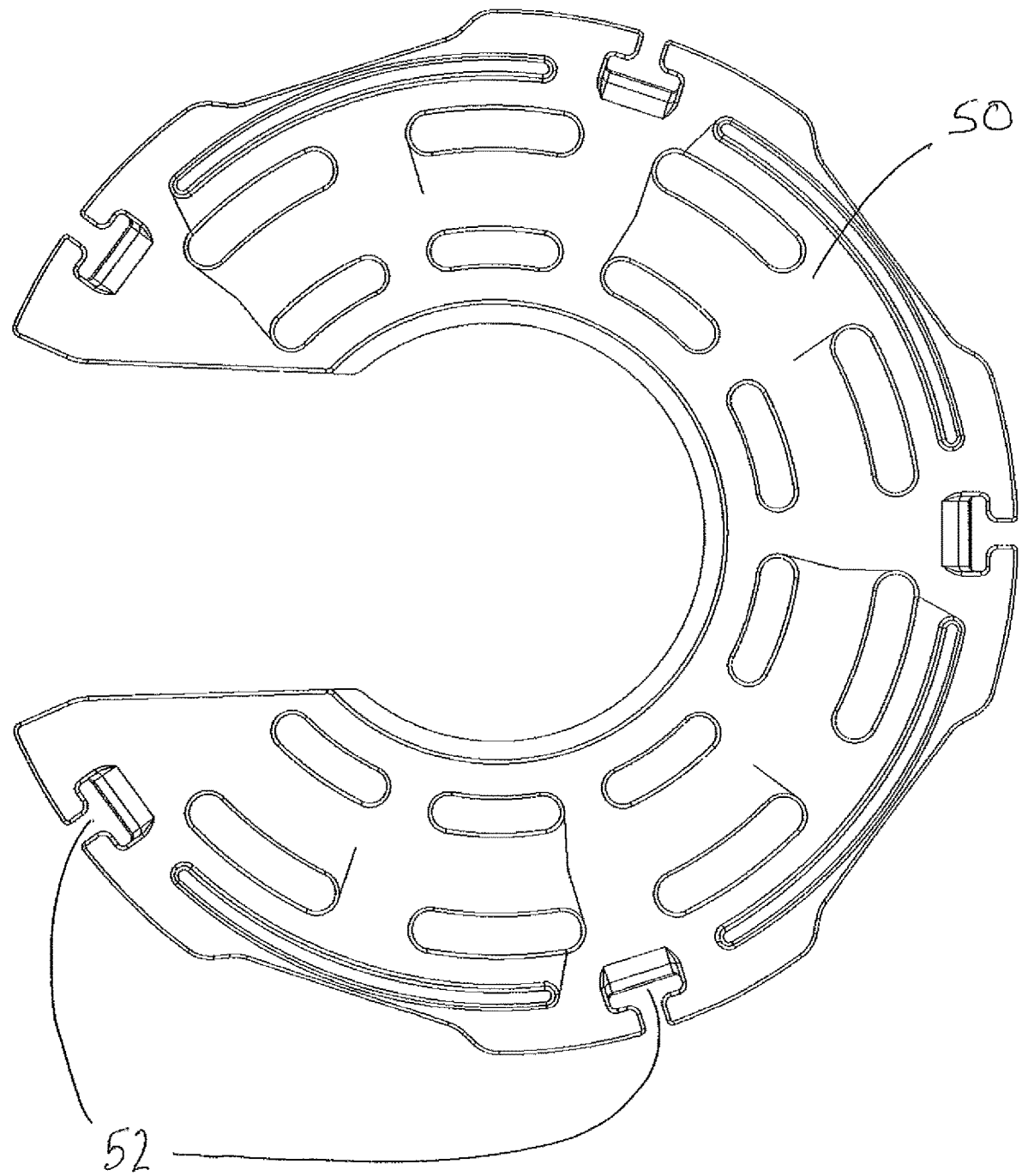

Various modifications may be made without departing from the scope of the invention. For instance FIGS. 9 and 10 show a second element 48 formed from two identical parts 50 in a similar way to the first element 10, but in this instance five equispaced guide formations 52 are provided.

Figure 11:
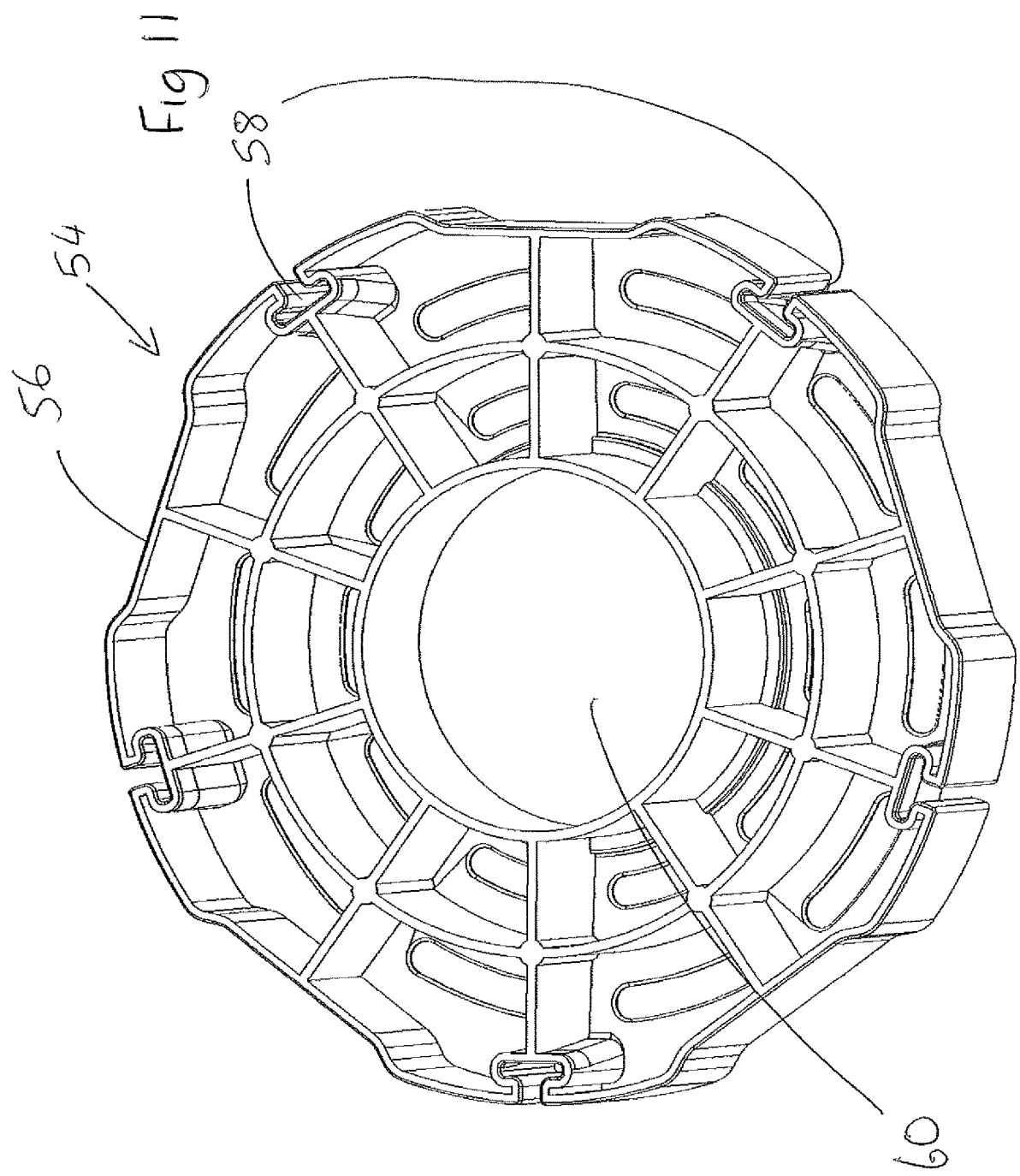
FIGS. 11 and 12 are similar views to FIGS. 9 and 10 of a third further element according to the invention.
Figure 12:
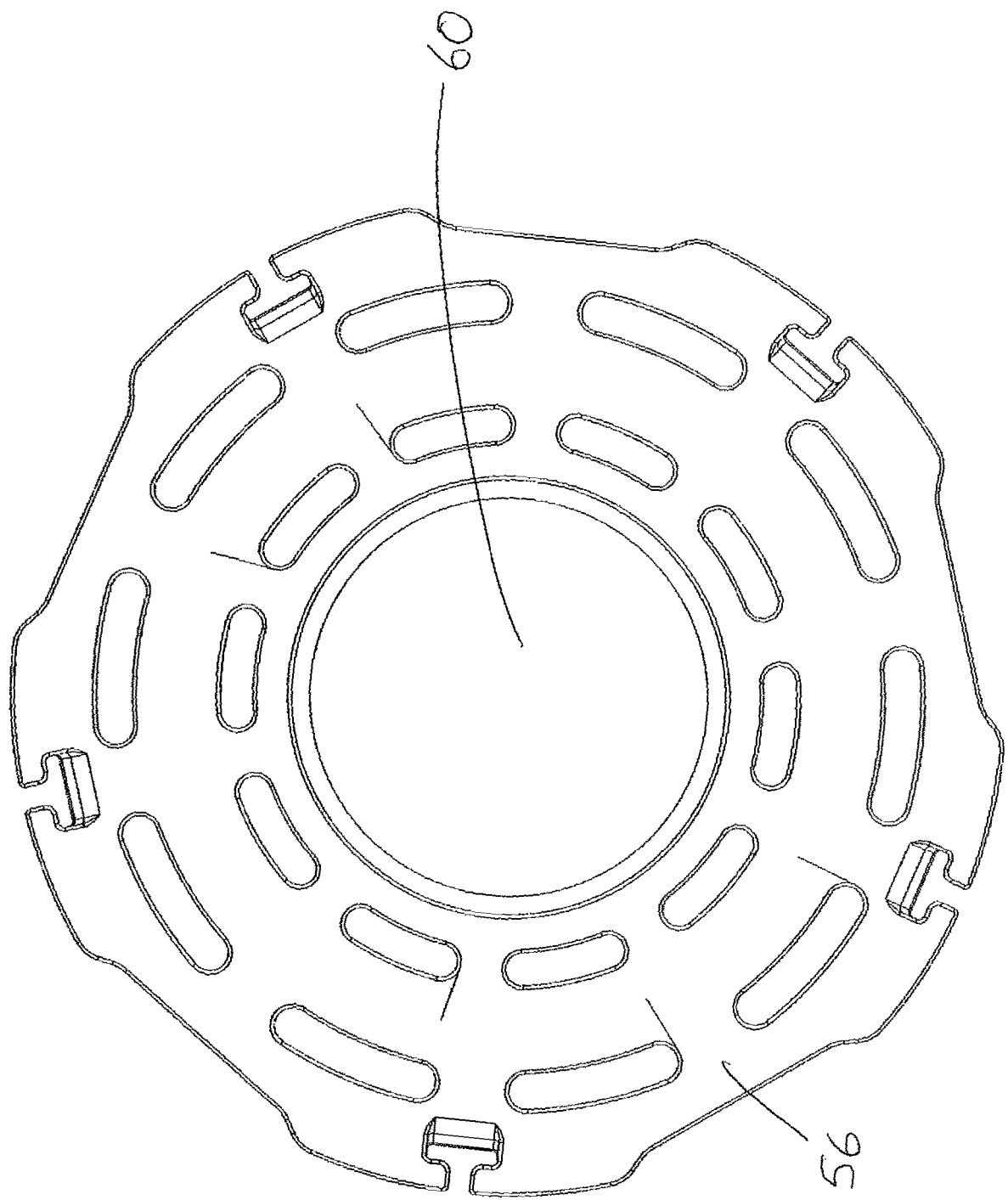
Figure 13:
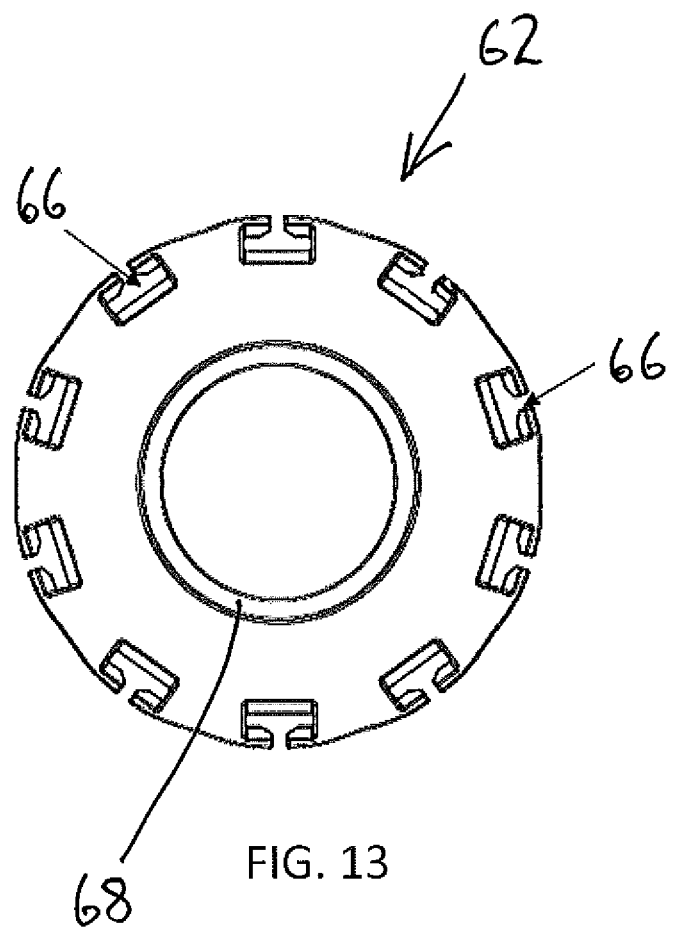
FIGS. 13 and 14 are respectively end and perspective views of a fourth element according to the invention.
Figure 14:
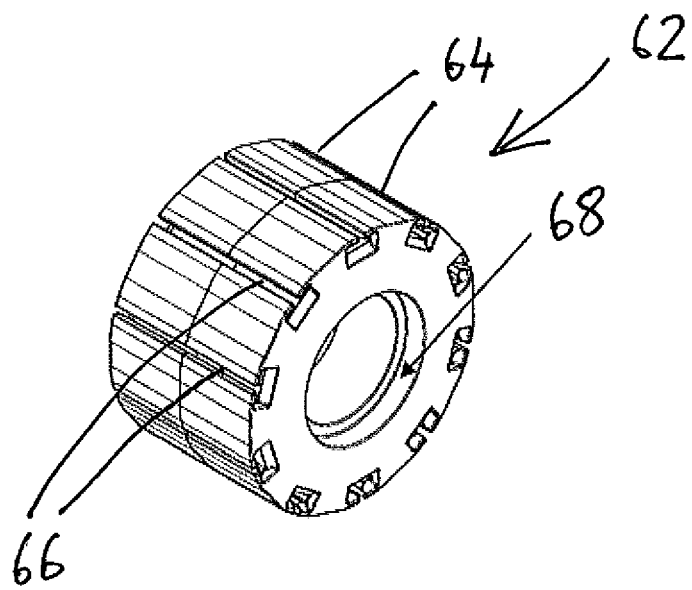
Figure 15:
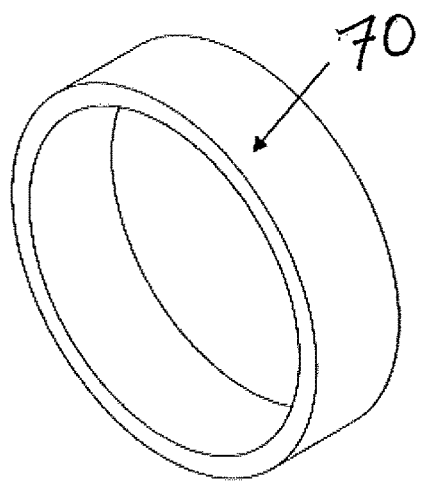
FIG. 15 is a perspective view of a component usable with the fourth elements.

FIGS. 11 and 12 show a third element 54 made again from two identical parts 56, again with five guide formations 58. In this instance the third element 54 forms an unbroken ring with a central opening 60, and does not have a side opening, and will therefore require to be axially slid along an elongate member.

FIGS. 13 to 18 show a further arrangement with a fourth element 62 which is similar in many respects to the elements 10, 48 and 54, except as indicated. The fourth element 62 is again formed of two identical parts 64, and does not have a side opening. In this instance ten guide formations 66 are provided equispaced around the circumference of the fourth element 62. The guide formations 66 again have a substantially T-shaped cross section.

A circumferential step 68 is provided on the inside of each fourth element spaced a short distance from the end to receive the end of an individual sleeve 70 which locates between each pair of fourth elements 62. Again the individual sleeves 70 are made of a softer material than the fourth element 62, and may be made for example of polyurethane.

Figure 16:
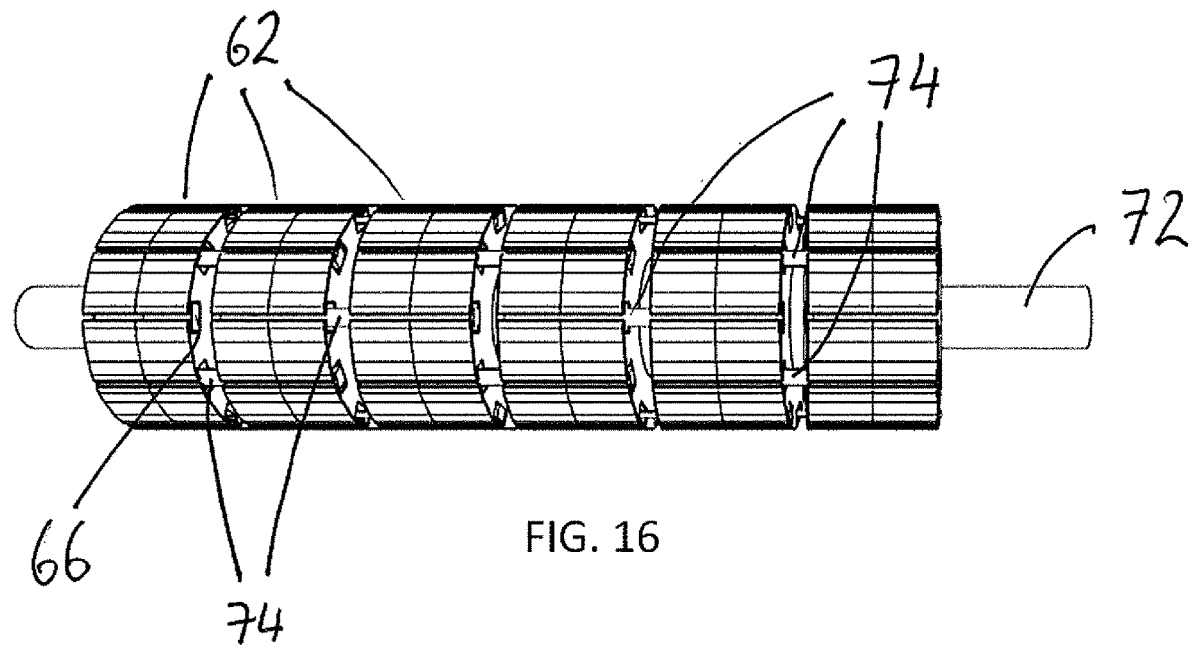
FIGS. 16 and 17 are respectively side views in straight and bent conditions of a plurality of the fourth elements in use.
Figure 17:
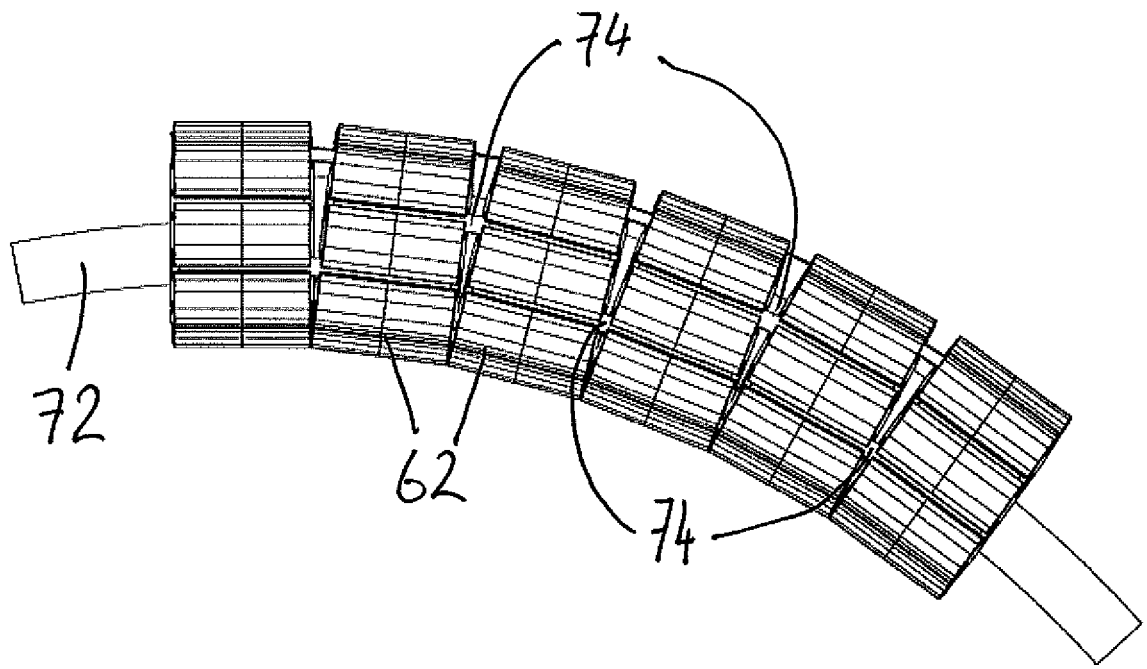
Figure 18:
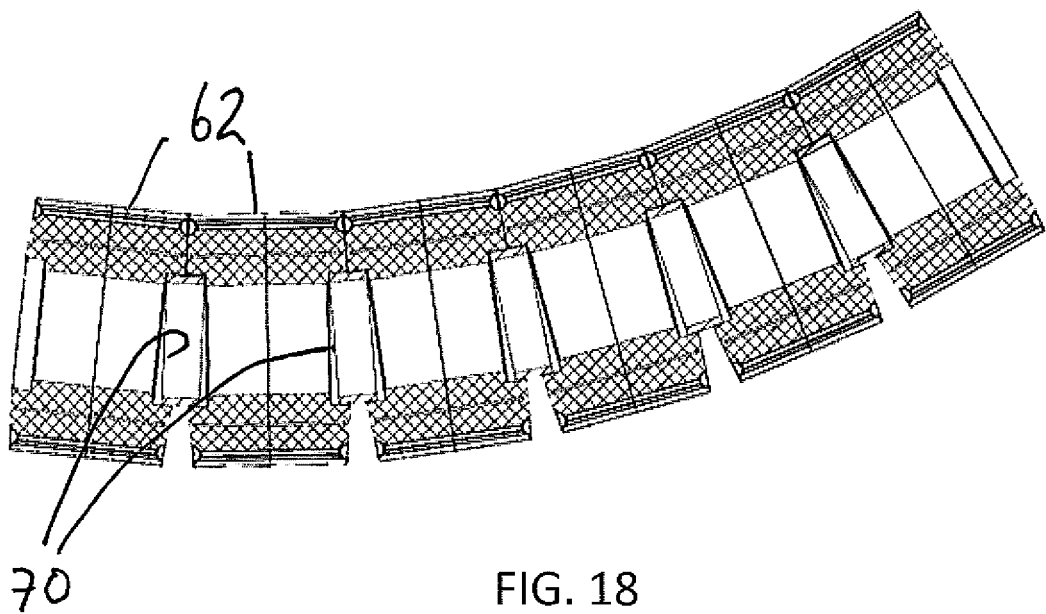
FIG. 18 is a diagrammatic cross sectional view of a plurality of first elements joined together.

FIGS. 16 to 18 show six fourth elements 62 mounted together around an elongate member 72 such as a pipe or pipeline as previously indicated.

In this instance link members 74 are provided in each guide formation 66, but with each link member 74 only connecting one fourth element 62 with an adjacent fourth element 62, and the link members 74 alternately interconnecting two adjacent fourth elements 62 in opposite directions, such that each pair of fourth elements 62 are interconnected by five link members 74 located in every other guide formation 66. The link members 74 are in the form of straps with over moulded end parts to engage against the end of a guide formation 66.

In use the link members 74 perform well under tension to limit the minimum bend radius. The individual sleeves 70 help the arrangement to bend and improve sheer resistance between the fourth elements and ensure the fourth elements pivot reliably relative to each other.

Figure 19:
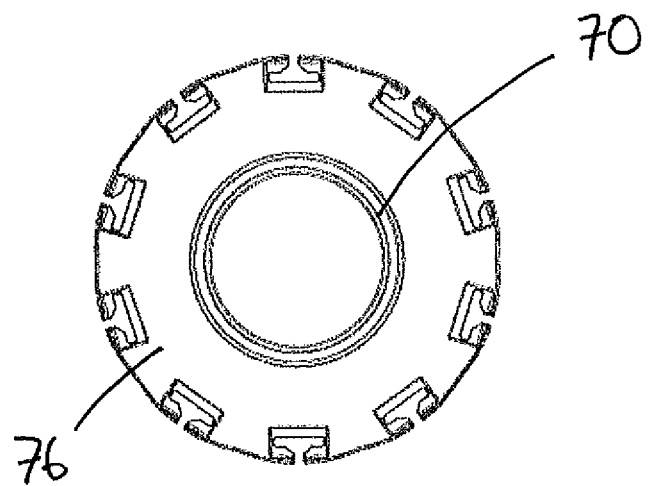
FIGS. 19 and 20 are respectively end and side views of part of a modified fourth element according to the invention.
Figure 20:
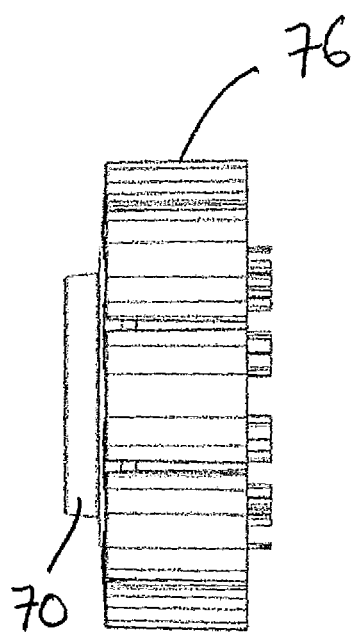
Figure 21:
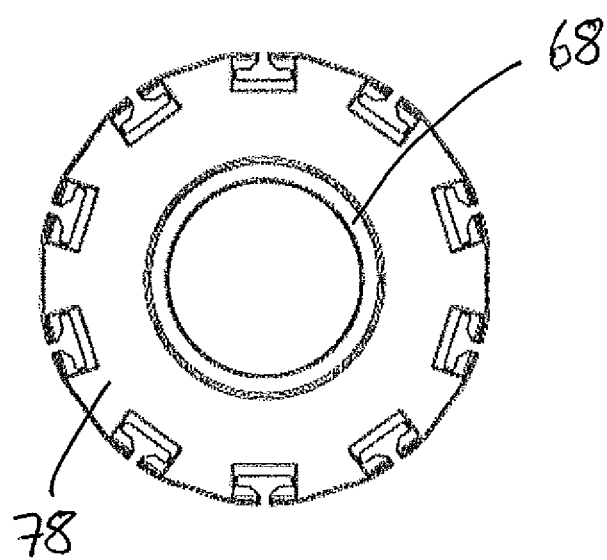
FIGS. 21 and 22 are respectively end and perspective views of a further part of the modified fourth element according to the invention.
Figure 22:
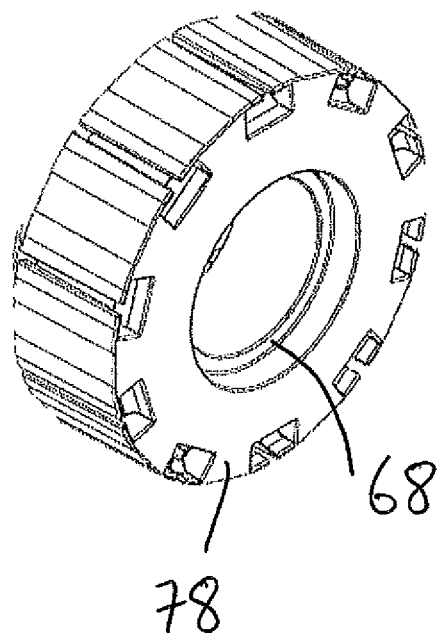

The individual sleeves 70 may be incorporated in the parts 64 of the fourth element 62 during injection moulding thereof. This will produce a male part 76 as shown in FIGS. 19 and 20, with an individual sleeve mounted in the step 68 during manufacture. A female part 78 is provided which is similar to the part 64, as shown in FIGS. 21 and 22, and the individual sleeve 70 on a male part 76 can be received in the step 68 on the female part 78.

Figure 23:
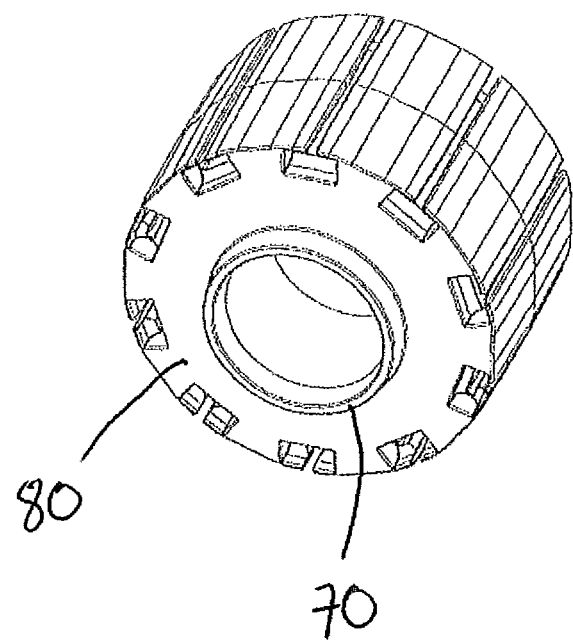
FIG. 23 is a diagrammatic perspective view of the modified fourth element according to the invention.

The two parts 76, 78 can be joined together as per the identical parts 64 to form a fourth element 80 with an integral individual sleeve 70, as shown in FIG. 23.

Whilst examples with five, six or ten guide formations have been shown, it may be possible for different numbers of guide formations to be provided. To vary the performance of the apparatus, the depth of the guide formations may be varied. This could be achieved by having guide formations of greater depth than as shown, and providing inserts in the formations if it is required to reduce the depth.

The link members may take a different form, and may for instance be in the form of a rope, or pins. Restriction formations may be provided along the length of the link members locatable between adjacent elements to limit movement between adjacent members.

Alternatively as indicated individual link members may be provided between adjacent elements. Different types, or different lengths of link members may be provided at different places along the apparatus, such as for instance to permit less bending of the elongate member at particular points, and for instance at end locations where the elongate member may be mountable to an article, or perhaps a further elongate member.

The engagement members may take a different form. For instance the engagement members could be bonded or attached to the elements, and the engagement members may be in the form of pads. The engagement members may be made of different material to the elements, and could be made of a resilient material.

The sleeve member may be over moulded onto the inside of the elements. Where a side opening is provided in the elements, closure parts may be locatable in the side openings once mounted on an elongate member. A temporary wrap may be provided on the apparatus, to for instance provide protection during installation. The temporary wrap may be made of a material which will degrade in use.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Guide apparatus for an elongate member, the apparatus comprising a plurality of elements locatable adjacent each other along at least part of the length of the elongate member, with each element being extendable around the elongate member, a plurality of elongate link members being provided between adjacent elements, the link members being spaced from each other around the elements, the link members permitting limited movement apart of the respective elements, such that the apparatus permits limited bending of the elongate member, with the elements being slidably movable relative to the link members, with guide formations provided on the elements, through which guide formations the link members slidably extend, in which the link members are different at different parts of the apparatus, to provide different stiffnesses and/or permit different amounts of flexing of the elongate member.

2. Guide apparatus according to claim 1, in which the guide formations have a generally T-shaped cross section, with a narrow opening and a wider main part to receive the link members once they have passed through the opening during formation of the apparatus.

3. Guide apparatus according to claim 1, in which the link members comprise lengths of planar material.

4. Guide apparatus according to claim 1, in which the link members extend along and between a plurality of adjacent elements.

5. Guide apparatus according to claim 1, in which restriction formations are provided on the link members to restrict the amount of movement between the link members and the elements, and the restriction formations may locate between adjacent elements.

6. Guide apparatus according to claim 1, in which outwardly extending engagement members are provided on ends of the elements, engageable against the ends of adjacent elements when the apparatus is bent, on the inside of the bend.

7. Guide apparatus according to claim 6, in which the engagement members are integrally formed with the remainder of the elements.

8. Guide apparatus according to claim 6, in which the engagement members are in the form of a plurality of discrete members provided on the ends of each element, the engagement members may be in the form of pads, may be selectively mountable on ends of each element, and may be formed of a resilient material.

9. Guide apparatus according to claim 1, in which the elements have a side opening such that they can be located on an elongate member, by the elongate member passing through the side opening, the elements may be configured such that they have to be deformed to permit the elongate member to pass through the side opening, adjacent elements may be orientated such that the side openings in adjacent elements are not aligned, and closure members may be provided locatable in the side openings once the elements are mounted on an elongate member.

10. Guide apparatus according to claim 1, in which the elements define a closed loop around the elongate members, and during formation of the apparatus the elements are movable axially along an elongate member to a required position.

11. Guide apparatus according to claim 1, in which the elements are made of a plastics material.

12. Guide apparatus according to claim 1, in which four, five or six link members are provided for each element.

13. Guide apparatus according to claim 1, in which the elements are formed in two parts, the two parts may be identical, and the two parts may have an open configuration with a front face and inner and outer sides, and a framework of webs therebetween.

14. Guide apparatus according to claim 1, in which a sleeve member is provided locatable around the elongate member within the elements, the sleeve member is formed of a softer material than the elements, a side opening is provided in the sleeve member to permit location on an elongate member by deformation of the sleeve member, spaced rims are provided along the length of the sleeve member, such that the elements locate between respective rims, the sleeve member may be is over moulded onto the elements, a respective individual sleeve member may be is provided extending between each pair of adjacent elements, formations are provided on the elements against which ends of the individual sleeve members engage, the formations are in the form of steps, and the individual sleeve members are incorporated in the elements during formation thereof, such that one side of the elements has a male form incorporating an individual sleeve member, which side is locatable adjacent a side of a further element with a female form without an individual sleeve member.

15. Guide apparatus according to claim 1, in which the link members are in the form of straps, rope or pins.

16. Guide apparatus according to claim 1, in which the link members are made of an elastic material.

17. Guide apparatus according to claim 1, in which adjacent link members on each element extend in opposite directions to each other, to each connect to just one respective adjacent element.

18. Guide apparatus according to claim 1, in which eight or ten guide formations are provided around each element.

19. Guide apparatus according to claim 1, in which a temporary wrap is provided around the apparatus to provide protection during installation, and the temporary wrap may be such as to degrade during use.

20. Guide apparatus for an elongate member, the apparatus comprising a plurality of elements locatable adjacent each other along at least part of the length of the elongate member, with each element being extendable around the elongate member, a plurality of elongate link members being provided between adjacent elements, the link members being spaced from each other around the elements, the link members permitting limited movement apart of the respective elements, such that the apparatus permits limited bending of the elongate member, with the elements being slidably movable relative to the link members, with guide formations provided on the elements, through which guide formations the link members slidably extend, in which the guide formations have a generally T-shaped cross section, with a narrow opening and a wider main part to receive the link members once they have passed through the opening during formation of the apparatus.

21. Guide apparatus for an elongate member, the apparatus comprising a plurality of elements locatable adjacent each other along at least part of the length of the elongate member, with each element being extendable around the elongate member, a plurality of elongate link members being provided between adjacent elements, the link members being spaced from each other around the elements, the link members permitting limited movement apart of the respective elements, such that the apparatus permits limited bending of the elongate member, with the elements being slidably movable relative to the link members, with guide formations provided on the elements, through which guide formations the link members slidably extend, in which adjacent link members on each element extend in opposite directions to each other, to each connect to just one respective adjacent element.

* * * * *